(12) United States Patent  (10) Patent No.: US 6,270,031 B1
Collins  (45) Date of Patent: Aug. 7, 2001

(54) TAPE TRANSPORT WITH CAM GUIDES

(75) Inventor: Gary W. Collins, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/452,784

(22) Filed: Dec. 2, 1999

(51) Int. Cl.$^7$ .................................................. G03B 1/04
(52) U.S. Cl. ....................... 242/358; 242/346.1; 360/132
(58) Field of Search ................................. 242/358, 346, 242/346.1; 360/132

(56) References Cited

U.S. PATENT DOCUMENTS

| | | |
|---|---|---|
| 1,953,985 | 4/1934 | Kindelmann et al. . |
| 2,094,581 | 10/1937 | Bundick et al. . |
| 2,209,178 | 7/1940 | Taesler . |
| 2,855,160 | 10/1958 | Fundingsland . |
| 3,115,314 | 12/1963 | Manley et al. . |
| 3,265,317 | 8/1966 | Liang et al. . |
| 3,467,342 * | 9/1969 | Siegemund ............................ 242/358 |
| 3,539,130 | 11/1970 | Winkler et al. . |
| 3,843,035 | 10/1974 | Fitterer et al. . |
| 3,923,271 | 12/1975 | Pertzsch et al. . |
| 5,206,771 * | 4/1993 | Katou et al. ........................... 242/358 |
| 5,251,844 * | 10/1993 | Albrecht et al. ..................... 242/358 |
| 5,284,308 * | 2/1994 | Comeaux et al. .................... 242/358 |
| 5,289,331 * | 2/1994 | Eaton et al. .......................... 242/358 |
| 5,358,193 | 10/1994 | Madsen et al. . |
| 5,562,258 * | 10/1996 | Sato et al. ............................ 242/346 |
| 5,758,837 * | 6/1998 | Doninelli .......................... 242/346.1 |
| 5,947,410 * | 9/1999 | Chrisite ............................ 242/346.1 |

FOREIGN PATENT DOCUMENTS

803808 * 11/1958 (GB) .................................... 242/358

* cited by examiner

Primary Examiner—Emmanuel M. Marcelo
(74) Attorney, Agent, or Firm—Brooks & Kushman P.C.

(57) ABSTRACT

A tape transport system includes two tape reels, each having a pair of flanges between which the tape is held. The parallel flange pairs position the tape in a direction normal to tape travel across the tape head contact surface. A cam guide is associated with each reel. Each cam guide has a curved surface over which the magnetic tape travels. The curved surface is positioned between the reel flange pair based on the amount of tape wound on the tape reel. The cam is positioned so that magnetic tape contacts the tape head contact surface at substantially the same location for any amount of tape wound on the tape reel.

10 Claims, 2 Drawing Sheets

TAPE TRANSPORT WITH CAM GUIDES

TECHNICAL FIELD

The present invention relates to guiding magnetic tape past reel flanges and across a tape access head.

BACKGROUND ART

Magnetic tape is commonly used to store voice and data information due to its reliability, cost efficiency, and ease of use. Magnetic tape may be made more useful and cost effective by increasing the density of information stored on the magnetic tape. One method of increasing information density is to decrease the thickness of the tape thereby permitting more tape to be stored in a given volume.

Decreasing the thickness of magnetic tape creates difficulties in a tape transport system. Thinner tape more easily stretches, increasing the possibility of read and write errors. Thin tape is also susceptible to folding, kinking, creasing, curling and other mechanical damage. Thin tape is more easily skewed relative to the tape head. These difficulties are exacerbated by complex tape transport systems requiring rollers, guides, and the like to drive the tape and position the tape relative to the tape head.

What is needed is an effective tape transport system for thin tape. The tape transport system must be able to guide the magnetic tape past the tape head without causing mechanical damage. The tape transport system should further be simple, inexpensive, and easy to maintain.

DISCLOSURE OF INVENTION

It is an object of the present invention to guide thin magnetic tape past a tape head.

It is another object of the present invention to position magnetic tape relative to the tape head.

It is still another object of the present invention to protect magnetic tape from mechanical damage along the tape path.

It is yet another object of the present invention to reduce the complexity of the tape path.

In carrying out the above objects and other objects and features of the present invention, a tape transport system is provided. The tape system includes two tape reels. Each reel has a pair of flanges between which the tape is held. The parallel flange pairs position the tape in a direction normal to tape travel across the tape head contact surface. A cam guide is associated with each reel. Each cam guide has a curved surface over which the magnetic tape travels. The curved surface is positioned between the reel flange pair based on the amount of tape wound on the tape reel. The cam is positioned so that magnetic tape contacts the tape head contact surface at substantially the same location for any amount of tape wound on the tape reel.

In an embodiment of the present invention, each cam guide curved surface is positioned between the reel tape flange pair so that the angle at which the magnetic tape leaves the reel when the reel is fully wound is substantially the same as the angle at which the magnetic tape leaves the reel when the reel is fully unwound.

In another embodiment of the present invention, each cam guide curved surface is positioned between the reel tape flange pair to guide tape near the edges of each flange in a tape direction non-normal with a direction of reel rotation where the tape crosses the flange edges.

In still another embodiment of the present invention, each cam guide curved surface moves completely out from between the flange pair to facilitate loading the associated tape reel into the tape transport system.

A cam for guiding magnetic tape out of a tape reel is also provided. The magnetic tape has an active side onto which information can be written and from which information can be read and a passive side opposite from the active side. The tape reel has two parallel flanges between which the magnetic tape is wound as a cylindrical tape pack. The cam has a curved surface over which travels the magnetic tape passive side. The curved surface fits between the tape reel flanges to guide tape near the tape pack in a path tangential to the tape pack. The cam curved surface moves between the flanges in response to the amount of tape in the tape pack to guide tape near the edges of each flange in a tape direction non-normal with a direction of reel rotation where the tape crosses the flange edges.

A method of guiding magnetic tape past the tape head is also provided. Tape from within a first reel is driven past the tape head an onto a second reel. Curved surfaces are inserted between the flange pairs of each respective reel. Each curved surface guides tape at the edge of the flange pair at a tape angle substantially the same when the reel is fully wound as when fully unwound.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
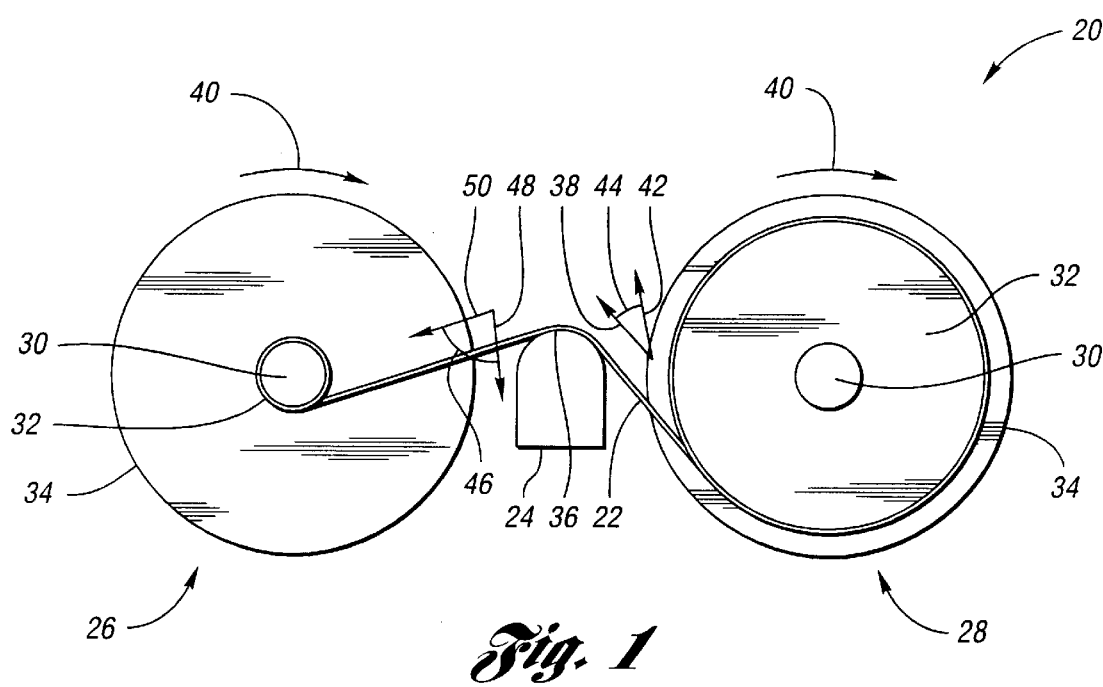
FIG. 1 is a schematic drawing of a tape transport system with a tape head located between two flanged tape reels.

Referring to FIG. 1, a schematic drawing of a tape transport system with a tape head located between two flanged tape reels is shown. A tape transport system, shown generally by 20, moves magnetic tape 22 past tape head 24. Tape 22 travels between two reels, shown generally by 26 and 28. Reels 26, 28 may be contained within a tape cassette. Alternatively, one or both of reels 26, 28 may be held within a tape cartridge. As will be recognized by one of ordinary skill in the art, the present invention will operate with a variety of means for holding tape 22. Each reel 26, 28 includes a hub 30 about which tape 22 is wound to form tape pack 32. Each reel 26, 28 also includes a pair of flanges 34 on either side of tape pack 32 between which tape 22 is held. In tape transport system 20, tape 22 leaves first reel 28, passes over curved contact surface 36 on tape head 24, then enters second reel 26. Flange pair 34 on each reel 26, 28 positions tape 22 on contact surface 36 in a direction normal to the direction of tape travel over contact surface 36. Typically, the tape is driven by tension from receiving reel 26. Receiving reel 26 may be driven by a tape drive, not shown, such as an electric motor. Various tape drives are well known in the art of tape transport systems.

Tape transport system 20 eliminates the need for a complex tape path including rollers, guides, pins, and the like, which may stretch or otherwise damage tape 22. Hence, tape transport system 20 presents an alternative to traditional tape transport systems for thin magnetic tape 22. However, tape transport system 20 has two difficulties which may limit effectiveness for use with thin tape. First, the portion of contact surface 36 covered by tape 22 depends on the amount of tape wound on each reel 26, 28. Second, tape 22 may leave each reel 26, 28 normal to the direction of motion of reel 26, 28, creating stresses on the edges of tape 22.

The varying coverage of contact surface 36 by tape 22 is caused by directly feeding tape 22 from reel 26, 28 to tape head 24. Tape 22 leaves cylindrical tape pack 32 at an angle tangential with surface of tape pack 32. Hence, the amount of tape wound on reel 26, 28 determines the location and angle at which tape 22 crosses flange pair 34. Since contact surface 36 is curved in the plane of tape travel past tape head 24, the region of contact between tape 22 and contact surface 36 also depends upon the amount of tape wound on reels 26, 28. When tape is fully unwound, as shown for reel 26, the region of contact with tape head 24 is diminished. When tape is fully wound, as shown for reel 28, the region of contact with tape head 24 is increased. Since tape head 24 typically includes a plurality of read elements and write elements for accessing tape 22 spaced across contact surface 36, varying the region of contact between tape 22 and contact surface 36 may affect the operation of tape head 24.

In addition to affecting the region of contact between tape 22 and contact surface 36, the amount of tape wound on reels 26, 28 also affects the stress on the edges of tape 22 created by flange pairs 34. Tape 22 leaves fully wound reel 28 in direction 40 tangential to both contact surface 36 and tape pack 32. Tape 22 must pass between flange pair 34 as it leaves reel 28. Since flange pair 34 positions tape 22 across contact surface 36, the edges of tape 22 may contact flange pair 34. Reel 28, rotating in flange direction 42, drives flange pair 34 in flange direction 42 at the point where tape 22 crosses the edge of flange pair 34. The angle between tape direction 38 and flange direction 42, tape angle 44, determines the amount of lateral stress placed on the edges of tape 22 by flange pair 34. As tape angle 44 increases, the lateral stress increases, increasing the potential for damage to the edges of tape 22. This can be seen for tape angle 46 associated with unwound reel 26. Flange direction 48 is substantially normal to tape direction 50, maximizing the stress on the edges of tape 22.

Figure 2:
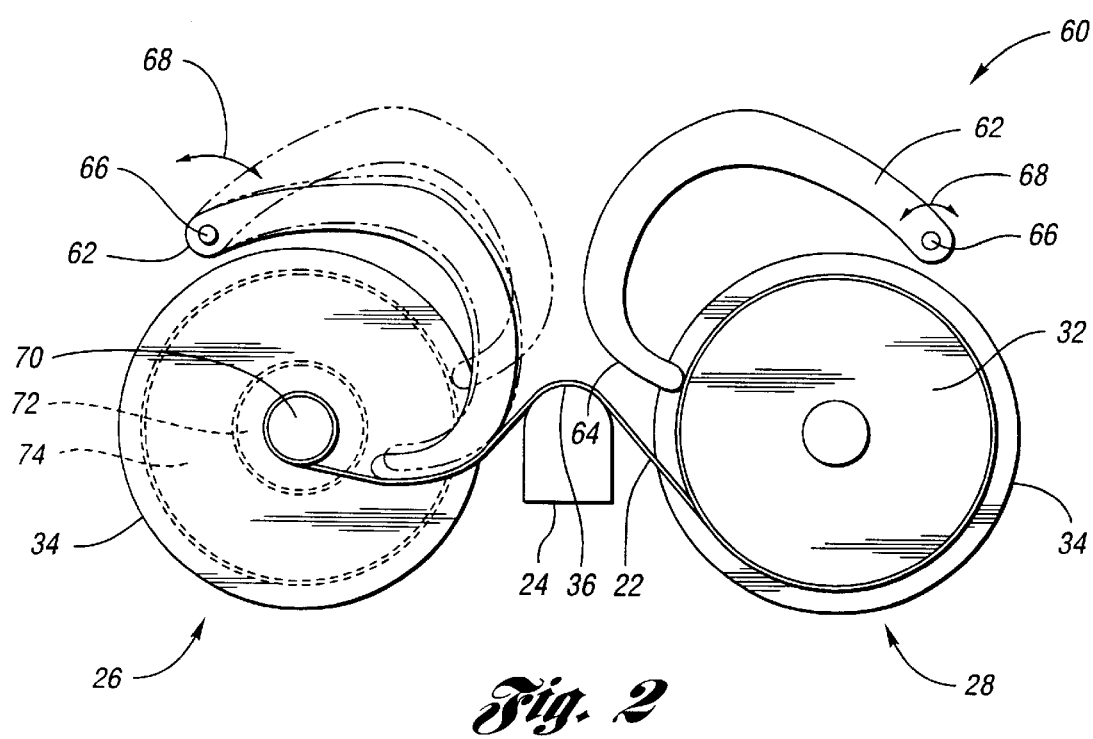
FIG. 2 is a schematic drawing of a tape transport system with a tape head located between two flanged tape reels and two cam tape guides according to an embodiment of the present invention.

Referring now to FIG. 2, a schematic drawing of a tape transport system with a tape head located between two flanged tape reels and two cam tape guides according to an embodiment of the present invention is shown. A tape transport system, shown generally by 60, includes cam guide 62 for each reel 26, 28. Cam guide 62 includes curved surface 64 over which travels tape 22 when cam guide 62 is in contact with tape 22. Cam guide 62 is rotatively driven by pin 66 in rotation direction 68 so that curved surface 64 moves between flange pairs 34. Curved surface 64 is positioned based on the amount of tape 22 wound on reel 26, 28 so that magnetic tape 22 reaches contact surface 36 at substantially the same location for any amount of tape 22 wound on reel 26, 28. Curved surface 64 is most fully inserted into flange pair 34 when a reel is unwound, as indicated by tape pack 70 for reel 26. As additional tape 22 is wound onto reel 26, as indicated by tape pack 72, curved surface 64 is gradually withdrawn from between flange pair 34. When reel 26 is fully wound, as indicated by tape pack 72, curved surface 64 no longer contacts tape 22.

In addition to providing substantially constant coverage of contact surface 36 regardless of the amount of tape wound on reels 26, 28, cam guides 62 also maintain a substantially constant tape angle 44, 46 for tape 22 leaving flange pairs 34. Curved surface 64 is shaped to keep tape angle 44, 46 approximately the same as cam guide 62 moves between flange pairs 34. Tape angle 44, 46 is a non-normal, acute angle to minimize the stress on the edges of tape 22. The design of curved surface 64, the positioning of the cam guide 62, and the resulting tape angle 44, 46 depend on the range of sizes for tape pack 32, the shape of contact surface 36, and the relative locations of reels 26, 28 and tape head 24. Such a design can be easily accomplished by one of ordinary skill in the art of cam design.

Figure 3:
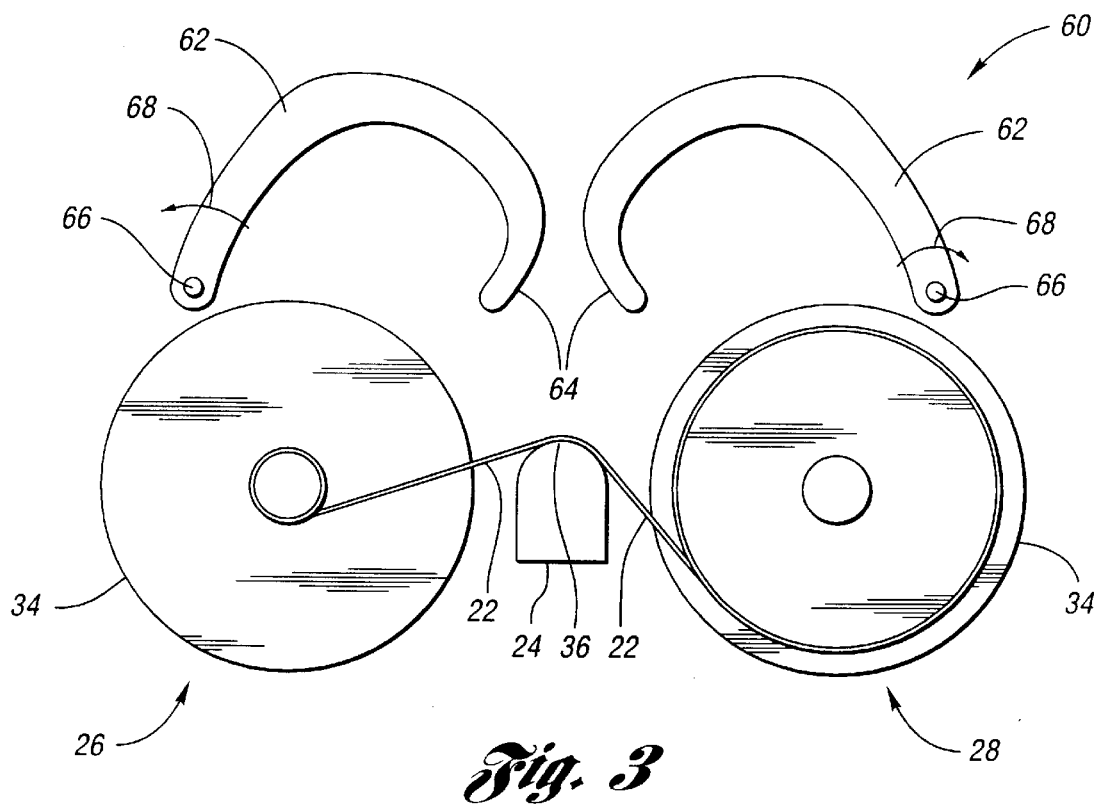
FIG. 3 is a schematic drawing of a tape transport system with cam tape guides rotated to allow tape loading according to an embodiment of the present invention.

Referring now to FIG. 3, a schematic drawing of a tape transport system with cam tape guides rotated to allow tape loading is shown. In an embodiment of the present invention, cam guides 62 rotate in direction 68 away from reels 26, 28, pulling curved surfaces 64 out from between flange edges 34. This permits access to tape 22 and reels 26, 28 for threading tape 22, changing reels 26, 28, loading or unloading a cartridge or cassette containing one or both of reels 26, 28, and the like.

Figure 4:
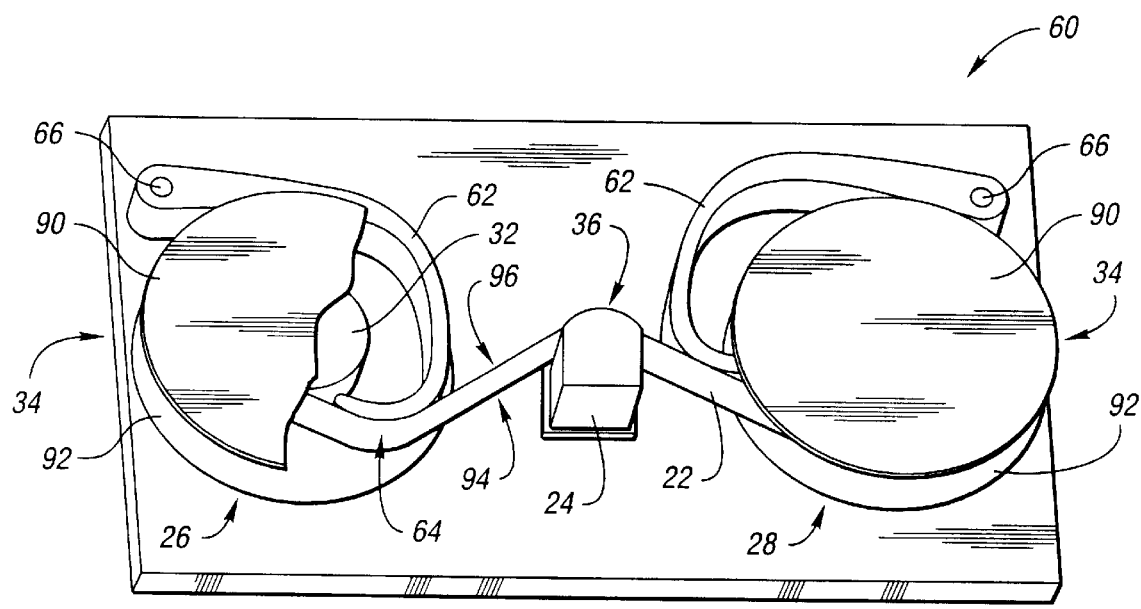
FIG. 4 is a detailed drawing of a tape transport system according to an embodiment of the present invention.

Referring now to FIG. 4, a detailed drawing of a tape transport system according to an embodiment of the present invention is shown. Flange pair 34 includes upper flanges 90 and lower flanges 92. Flanges 90, 92 form parallel surfaces for guiding tape 22 past contact surface 36. A portion of upper flange 90 for reel 26 is shown cut away to show tape pack 32 and tape 22 riding on curved surface 64 of cam guide 62. Tape 22 has an active side, shown generally by 94, onto which data can be written by tape head 24 or from which data can be read by tape head 24 as tape 22 passed contact surface 36. Tape 22 also has passive side 96 opposite active side 94 which travels over curved surfaces 64 of cam guides 62.

While embodiments of the invention have been illustrated and described, it is not intended that these embodiments illustrate and describe all possible forms of the invention. Rather, it is intended that the following claims cover all modifications and alternative designs, and all equivalents, that fall within the spirit and scope of this invention.

What is claimed is:

1. A tape transport system for positioning magnetic tape comprising:

a first reel with a first pair of parallel flanges between which tape is held, each flange in the first flange pair having a radius greater than a radial distance covered by tape when the first reel is full of tape;

a second reel with a second pair of parallel flanges between which tape is held, each flange in the second flange pair having a radius greater than a radial distance covered by tape when the second reel is full of tape, the second reel aligned with the first reel such that the first flange pair is parallel with the second flange pair;

a tape head having a curved tape contact surface, the tape head positioned between the first reel and the second reel such that tape extends from the first reel over the contact surface to the second reel;

a tape drive operative to unwind tape from one reel, move the tape past the tape head contact surface, and wind the tape on the other reel; and a cam guide associated with each reel, each cam guide comprising a curved surface over which the magnetic tape travels, each cam guide curved surface positioned between the associated reel tape flange pair based on the amount of tape wound on the associated tape reel, each cam guide curved surface supporting the magnetic tape so that the magnetic tape contacts the tape head contact surface at substantially the same location for any amount of tape wound on the associated tape reel.

2. A tape transport system as in claim 1 wherein each cam guide curved surface further moves between the associated reel tape flange pair so that the angle at which the magnetic tape leaves the associated reel when the associated reel is fully wound with magnetic tape is substantially the same as the angle at which the magnetic tape leaves the associated reel when the associated reel is fully unwound.

3. A tape transport system as in claim 1 wherein each cam guide curved surface further moves between the associated reel tape flange pair to guide tape near the edges of each flange in a tape direction non-normal with a direction of reel rotation where the tape crosses the flange edges.

4. A tape transport system as in claim 1 wherein each cam guide curved surface is operative to move completely out from between the associated reel tape flange pair to facilitate loading the associated tape reel into the tape transport system.

5. A cam for guiding magnetic tape out of a tape reel, the magnetic tape having an active side comprising a surface onto which information can be written and from which information can be read, the magnetic tape also having a passive side opposite from the active side, the tape reel comprising two parallel flanges between which the magnetic tape is wound as a cylindrical tape pack, each flange having an outside edge, the cam comprising a curved surface over which travels the magnetic tape passive side, the curved surface fitting between the tape reel flanges, the curved surface guiding tape near the tape pack in a path tangential to the tape pack, the cam curved surface operative to move between the flanges in response to the amount of tape in the tape pack to guide tape near the edges of each flange in a tape direction non-normal with a direction of reel rotation where the tape crosses the flange edges.

6. A cam for guiding magnetic tape out of a tape reel as in claim 5 further operative to move the curved surface from between the tape reel flanges to facilitate loading the associated tape reel into the tape transport system.

7. A method of guiding tape past a tape head comprising:

driving the tape from within a first reel having a first pair of flanges;

driving the tape from the first reel past the tape head;

driving the tape from the tape head onto a second reel having a second pair of flanges;

inserting a first curved surface between the first pair of flanges, the first curved surface guiding tape exiting from within the first reel at a first reel tape angle substantially the same when the first reel is fully wound as the first reel tape angle of tape exiting the first reel when the first reel is fully unwound; and inserting a second curved surface between the second pair of flanges, the second curved surface guiding tape exiting from within the second reel at a second reel tape angle substantially the same when the second reel is fully wound as the second reel tape angle of tape exiting the second reel when the second reel is fully unwound.

8. A method of guiding tape past a tape head as in claim 7 wherein the tape head includes a curved contact surface past which the magnetic tape is driven, the method further comprising adjusting each curved surface so that the magnetic tape contacts the tape head contact surface in substantially the same location for any amount of tape wound on each reel.

9. A method of guiding tape past a tape head as in claim 7 further comprising adjusting the first curved surface so that the first reel tape angle is an acute angle and adjusting the second curved surface so that the second reel tape angle is an acute angle.

10. A method of guiding tape past a tape head as in claim 7 further comprising moving the first curved surface from between the first pair of flanges and moving the second curved surface from between the second pair of flanges to facilitate loading the associated tape reel into the tape transport system.

* * * * *